United States Patent
Tamura (10) Patent No.: US 10,767,671 B2
(45) Date of Patent: Sep. 8, 2020

(54) SHAFT COUPLING STRUCTURE AND FLUID PRESSURE APPARATUS

(71) Applicant: SMC CORPORATION, Chiyoda-ku (JP)

(72) Inventor: Ken Tamura, Noda (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 16/490,770

(22) PCT Filed: Feb. 26, 2018

(86) PCT No.: PCT/JP2018/006912
§ 371 (c)(1),
(2) Date: Sep. 3, 2019

(87) PCT Pub. No.: WO2018/163880
PCT Pub. Date: Sep. 13, 2018

(65) Prior Publication Data
US 2020/0003236 A1 Jan. 2, 2020

(30) Foreign Application Priority Data
Mar. 8, 2017 (JP) .................................. 2017-043590

(51) Int. Cl.
*F15B 15/14* (2006.01)
*F16J 1/12* (2006.01)

(52) U.S. Cl.
CPC ...... *F15B 15/1447* (2013.01); *F15B 15/1471* (2013.01); *F16J 1/12* (2013.01)

(58) Field of Classification Search
CPC .............. F15B 15/1471; F15B 15/1447; F15B 15/226; F16J 1/12; F16D 1/06; F16D 1/08
See application file for complete search history.

(56) References Cited

U.S. PATENT DOCUMENTS

| | | | |
|---|---|---|---|
| 10,352,337 B2 * | 7/2019 | Monden | F15B 15/149 |
| 10,570,934 B2 * | 2/2020 | Kudo | F15B 15/1452 |
| 2008/0173169 A1 * | 7/2008 | Ikari | F15B 15/1447 92/165 R |
| 2014/0157981 A1 * | 6/2014 | Saito | F16J 1/12 92/169.1 |
| 2015/0285277 A1 * | 10/2015 | Takakuwa | F15B 15/149 91/418 |

FOREIGN PATENT DOCUMENTS

JP 2014-114874 A 6/2014

OTHER PUBLICATIONS

International Search Report and Written Opinion dated Jun. 5, 2018 in PCT/JP2018/006912 filed Feb. 26, 2018.

* cited by examiner

*Primary Examiner* — Abiy Teka
(74) *Attorney, Agent, or Firm* — Oblon, McClelland, Maier & Neustadt, L.L.P.

(57) ABSTRACT

A shaft coupling structure includes a stopper member attached to a piston rod so as to be relatively rotatable and has a plurality of engagement projections and a plurality of slot grooves. The plurality of engagement projections are inserted into the slot grooves, respectively, and include a plurality of inlet grooves and a plurality of inclined engagement grooves extending in a direction inclined from the circumferential direction. The piston rod and a piston member are coupled together through the stopper member so as to be relatively unmovable in the axial direction.

13 Claims, 10 Drawing Sheets

SHAFT COUPLING STRUCTURE AND FLUID PRESSURE APPARATUS

TECHNICAL FIELD

The present invention relates to a shaft coupling structure for coupling a shaft member and a counterpart member together. Further, the present invention relates to a fluid pressure apparatus.

DESCRIPTION OF THE RELATED ART

Background Art

Examples of apparatuses having a shaft coupling structure for coupling a shaft member to a counterpart member to be used in combination with the shaft member include a fluid pressure apparatus having a piston. The fluid pressure apparatus takes various forms. For example, as transportation means (actuator) for transporting a workpiece, etc., fluid pressure cylinders having a piston which is displaced under the operation of supplying pressure fluid is known. In general, the fluid pressure cylinder includes a cylinder tube, a piston provided movably in an axial direction within the cylinder tube, and a piston rod coupled to the piston (e.g., see Japanese Laid-Open Patent Publication No. 2014-114874). In this case, the piston rod corresponds to the "shaft member" and the piston corresponds to the "counterpart member".

SUMMARY OF INVENTION

Examples of a conventional shaft coupling structure include (1) tightening using screws or bolts, (2) tightening by crimping (applying pressure) to deform the members plastically, (3) coupling by welding, and (4) coupling using T slots.

In the case of (1) the shaft coupling structure where tightening is performed using screws or bolts, a tool for tightening screws or bolts, and a workspace for performing the tightening operation are required. In the case of (2) the shaft coupling structure where tightening is performed by crimping to deform the members plastically, equipment and jigs for crimping members are required. In the case of (3) the shaft coupling structure where members are coupled together by welding, welding facilities are required. In the case of (4) the shaft coupling structure where members are coupled together using T slots, a space in the lateral direction is required for moving the shaft member in a side surface direction.

The present invention has been made taking into account the problems of this type, and an object of the present invention is to provide a shaft coupling structure and a fluid pressure apparatus in which it is possible to reduce production costs or assembling man-hours by making it possible to couple a shaft member and a counterpart member thereof together manually without using any tools or facilities, and achieve reduction of a space required for the assembling operation.

In order to achieve the above object, the present invention provides a shaft coupling structure for coupling a shaft member to a counterpart member to be used in combination with the shaft member. The shaft coupling structure includes a stopper member attached to the shaft member so as to be relatively rotatable, and having a plurality of engagement projections protruding outward from the stopper member, the engagement projections being arranged at intervals in a circumferential direction, and a plurality of slot grooves provided on a circumference of circle in the counterpart member. The plurality of engagement projections are inserted into the slot grooves, respectively. The plurality of slot grooves include a plurality of inlet grooves opened at an end surface of the counterpart member and having a depth in an axial direction, and a plurality of inclined engagement grooves connected to the plurality of inlet grooves and extending in a direction inclined from the circumferential direction, the plurality of inclined engagement grooves being engaged with the plurality of engagement projections. The shaft member and the counterpart member are coupled together through the stopper member so as to be relatively unmovable in the axial direction.

In the shaft coupling structure having the above structure, at the time of coupling the shaft member and the counterpart member together, by moving the stopper member attached to the shaft member, relative to the counterpart member in the axial direction, the engagement projections of the stopper member are inserted into the inlet grooves of the slot grooves formed in the counterpart member. By pushing the engagement projections further into the inlet grooves, the stopper member is rotated inside the counterpart member under a guiding action of the inclined engagement grooves. Therefore, without using any dedicated tools, it is possible to connect the shaft member and the counterpart member together easily, by rotating the stopper member relative to the counterpart member at the time of assembling. That is, assembling thereof can be performed without using any tools. Further, since the shaft member and the output member can be coupled together by displacement in only one direction, the assembling operation can be performed in a compact space. Thus, the assembling operation can be simplified by adopting the shaft coupling structure of the present invention.

Preferably, an annular stopper attachment groove is provided in an outer circumferential portion of the shaft member, and the stopper member is made of a plurality of stopper pieces divided in the circumferential direction, and is installed in the stopper attachment groove.

In the structure, the stopper member can be attached to the outer circumferential portion of the shaft member easily at the time of assembling.

Preferably, the shaft coupling structure further includes a rotation stop member inserted into the plurality of slot grooves so as to be nonrotatable relative to the counterpart member, and the rotation stop member prevents movement of the plurality of the engagement projections toward the inlet grooves.

In the structure, it is possible to avoid a situation in which, after the assembling operation, the stopper member is rotated and consequently the shaft member is detached from the counterpart member. Therefore, it is possible to reliably maintain the coupling state of the shaft member and the counterpart member after assembling.

Preferably, the rotation stop member includes a plurality of protrusions inserted into the plurality of inlet grooves, and the plurality of protrusions face the plurality of engagement projections in the circumferential direction.

In the structure, when the stopper member is rotated relative to the counterpart member, since the engagement projections are locked by the protrusions, it is possible to reliably maintain the connection state between the shaft member and the counterpart member after assembling thereof.

Preferably, the rotation stop member includes an annular base part formed in an annular shape around the shaft member, and the plurality of protrusions protrude in the axial direction from the annular base part.

In the structure, since the rotation stop member is a single member having the annular base part and the plurality of protrusions, it is possible to simply attach the rotation stop member to the counterpart member easily by a single attachment operation.

Preferably, the plurality of engagement projections are inclined along the plurality of inclined engagement grooves.

In the structure, it is possible to reduce backlash in the axial direction, between the engagement projection and the inclined engagement groove.

Preferably, each of the plurality of engagement projections includes a first surface orientated in a direction in which the shaft member is inserted into the counterpart member and a second surface oriented in an opposite direction of the first surface, and each of the plurality of inclined engagement grooves includes an inclined guide surface facing the first surface in a non-parallel manner, and inclined from the circumferential direction.

In the structure, there is an angular difference between the inclined guide surface against which the engagement projection is pressed and the first surface of the engagement projection. Therefore, the friction resistance between the engagement projection and the inclined guide surface is reduced, and accordingly the engagement projection can be inserted into the engagement groove smoothly. Therefore, since the stopper member can be rotated easily with respect to the counterpart member, it is possible to reduce the force for pushing the shaft member into the counterpart member, and thus the assembling operation can be performed more easily.

Preferably, each of the plurality of engagement projections includes a first surface oriented in a direction in which the shaft member is inserted into the counterpart member and a second surface oriented in an opposite direction of the first surface, and each of the plurality of inclined engagement grooves includes an inclined guide surface facing the second surface in a parallel manner, and inclined from the circumferential direction.

In the structure, since the contact area between the engagement projection and the inclined engagement groove in the contact surface between the shaft member and the counterpart member in the detachment direction becomes larger, the friction resistance in the direction in which the engagement projection is detached from the inclined engagement groove becomes higher. Thus, it is possible suitably suppress the rotation movement of the stopper member when the force in the detachment direction is applied.

Preferably, the counterpart member is a piston body which is displaceable in an axial direction within a slide hole, and the shaft member is a piston rod protruding in the axial direction from the piston body.

In the structure, it is possible to simplify the assembling operation of the piston assembly made up of the piston body and the piston rod.

Preferably, the shaft member and the counterpart member are coupled together through the stopper member so as to be relatively rotatable.

In the structure, regardless of the outer shape of the piston body, at the time of installation of a fluid pressure apparatus having the piston assembly, to equipment, the piston can be rotated easily, which is convenient in installation thereof.

Preferably, the shaft member is a piston rod protruding from a body of a fluid pressure cylinder in an axial direction, a guide rod is slidably supported by the body along an axis of the piston rod, and the counterpart member is an output member coupled to the piston rod outside the body, and coupled to the guide rod.

In the structure, in the assembling process, it is possible to couple the output member to the piston rod, without using any dedicated tools or facilities. Further, unlike the case of coupling using bolts, since the output member and the piston rod are coupled together in a state where the output member and the piston rod have small backlash in the radial direction of the piston rod (in a floating state in the radial direction), the output member and the piston rod are automatically centered on each other. Therefore, no jig for the centering operation is required, and reduction in the man-hour for assembling is achieved. Thus, it is possible to simplify the assembling operation of the guide-equipped cylinder having the piston rod and the output member.

Further, the present invention provides a fluid pressure apparatus including a piston rod and a counterpart member coupled to the piston rod. Further, the fluid pressure apparatus includes a stopper member attached to the piston rod so as to be relatively rotatable, and having a plurality of engagement projections protruding outward from the stopper member, the engagement projections being arranged at intervals in a circumferential direction, and a plurality of slot grooves provided on a circumference of circle in the counterpart member. The plurality of engagement projections are inserted into the slot grooves, respectively. The plurality of slot grooves include a plurality of inlet grooves opened at an end surface of the counterpart member and having a depth in an axial direction, and a plurality of inclined engagement grooves connected to the plurality of inlet grooves and extending in a direction inclined from the circumferential direction, the plurality of inclined engagement grooves being engaged with the plurality of engagement projections. The piston rod and the counterpart member are coupled together through the stopper member so as to be relatively unmovable in the axial direction.

Preferably, the fluid pressure apparatus is in the form of a fluid pressure cylinder, a valve apparatus, a length measuring cylinder, a slide table, or a chuck apparatus.

In the shaft coupling structure and the fluid pressure apparatus of the present invention, it is possible to reduce the production cost or the man-hour for assembling by making it possible to couple the shaft member and the counterpart member manually without using any tools or facilities, and achieve reduction of a space required for the assembling operation.

The above and other objects, features and advantages of the present invention will become more apparent from the following description when taken in conjunction with the accompanying drawings in which preferred embodiments of the present invention are shown by way of illustrative example.

DESCRIPTION OF EMBODIMENTS

Hereinafter, a shaft coupling structure and a fluid pressure apparatus according to preferred embodiments of the present invention will be described with reference to the accompanying drawings.

Figure 1:
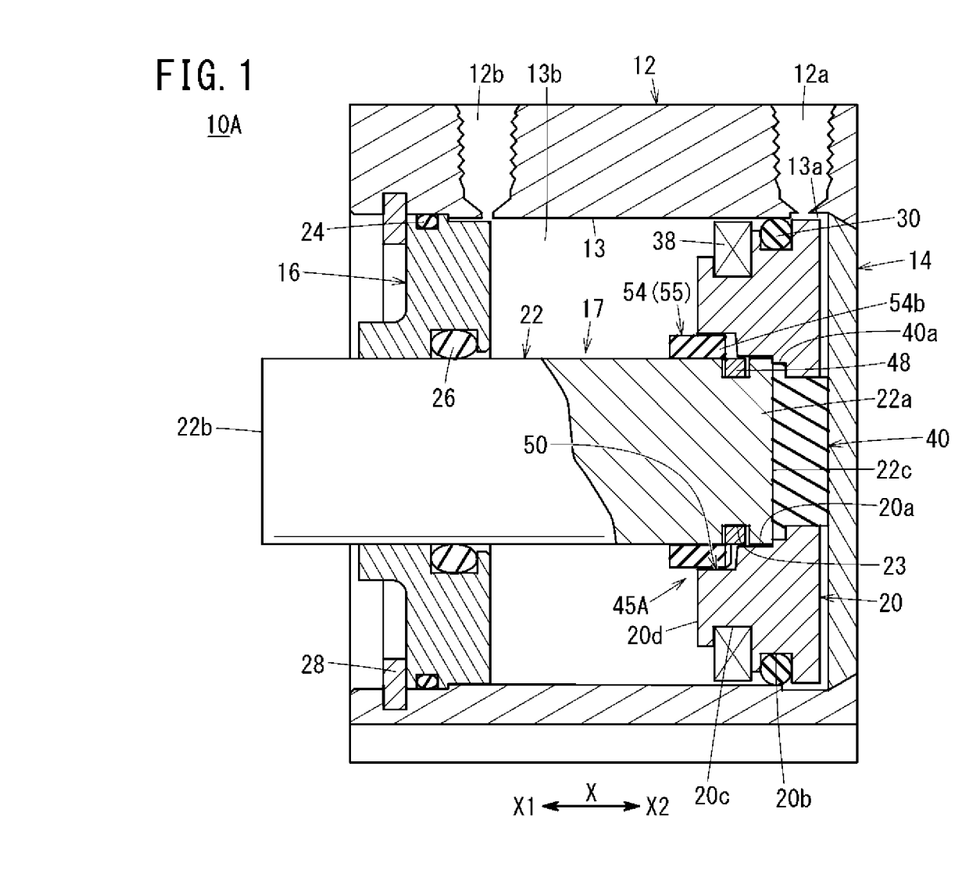
FIG. 1 is a cross sectional view showing a fluid pressure cylinder having a shaft coupling structure according to a first embodiment of the present invention.

A fluid pressure cylinder 10A shown as an example of the fluid pressure apparatus in FIG. 1 includes a hollow cylinder tube 12 (body), a head cover 14 provided at one end of the cylinder tube 12, a rod cover 16 provided at the other end of the cylinder tube 12, and a piston assembly 17 provided movably back and forth (reciprocating motion) in an axial direction of the cylinder tube 12.

The piston assembly 17 includes a piston member 20 provided in the cylinder tube 12 so as to be movable in an axial direction indicated by an arrow X, and a piston rod 22 coupled to the piston member 20. The fluid pressure cylinder 10A is used, e.g., as an actuator for transportation or the like of a workpiece.

For example, the cylinder tube 12 comprises a tubular member which is made of metal such as aluminum alloy, and extends in the axial direction. In the embodiment of the present invention, the cylinder tube 12 has a hollow cylindrical shape. The cylinder tube 12 includes a first port 12a provided at one end in the axial direction indicated by an arrow X2, a second port 12b provided at the other end in the axial direction indicated by an arrow X1, and a slide hole 13 (cylinder chamber) communicating with the first port 12a and the second port 12b.

For example, the head cover 14 is a plate shaped member made of metal as in the case of the cylinder tube 12. The head cover 14 closes one end of the cylinder tube 12 (the end in the direction indicated by the arrow X2). The one end of the cylinder tube 12 is closed by the head cover 14 in an air-tight manner.

For example, the rod cover 16 is a circular ring member made of metal, which is the same as that used for the cylinder tube 12. The rod cover 16 closes the other end of the cylinder tube 12 (the end in the direction indicated by the arrow X1). An outer seal member 24 is attached to an outer circumferential portion of the rod cover 16. The outer seal member 24 is made of an elastic material, and provides sealing between the outer circumferential surface of the rod cover 16 and the inner circumferential surface of the slide hole 13.

An inner seal member 26 is attached to an inner circumferential portion of the rod cover 16. The inner seal member 26 is made of an elastic material, and provides sealing between the inner circumferential surface of the rod cover 16 and the outer circumferential surface of the piston rod 22. The rod cover 16 is locked by a stopper 28 fixed to the inner circumferential portion of the cylinder tube 12 at the other end side.

The piston member 20 is accommodated in the cylinder tube 12 (slide hole 13), and slidable in the axial direction.

The piston member 20 divides the interior of the slide hole 13 into a first pressure chamber 13a on the first port 12a side and a second pressure chamber 13b on the second port 12b side. In the embodiment, the piston member 20 is coupled to a proximal end 22a of the piston rod 22.

Figure 3:
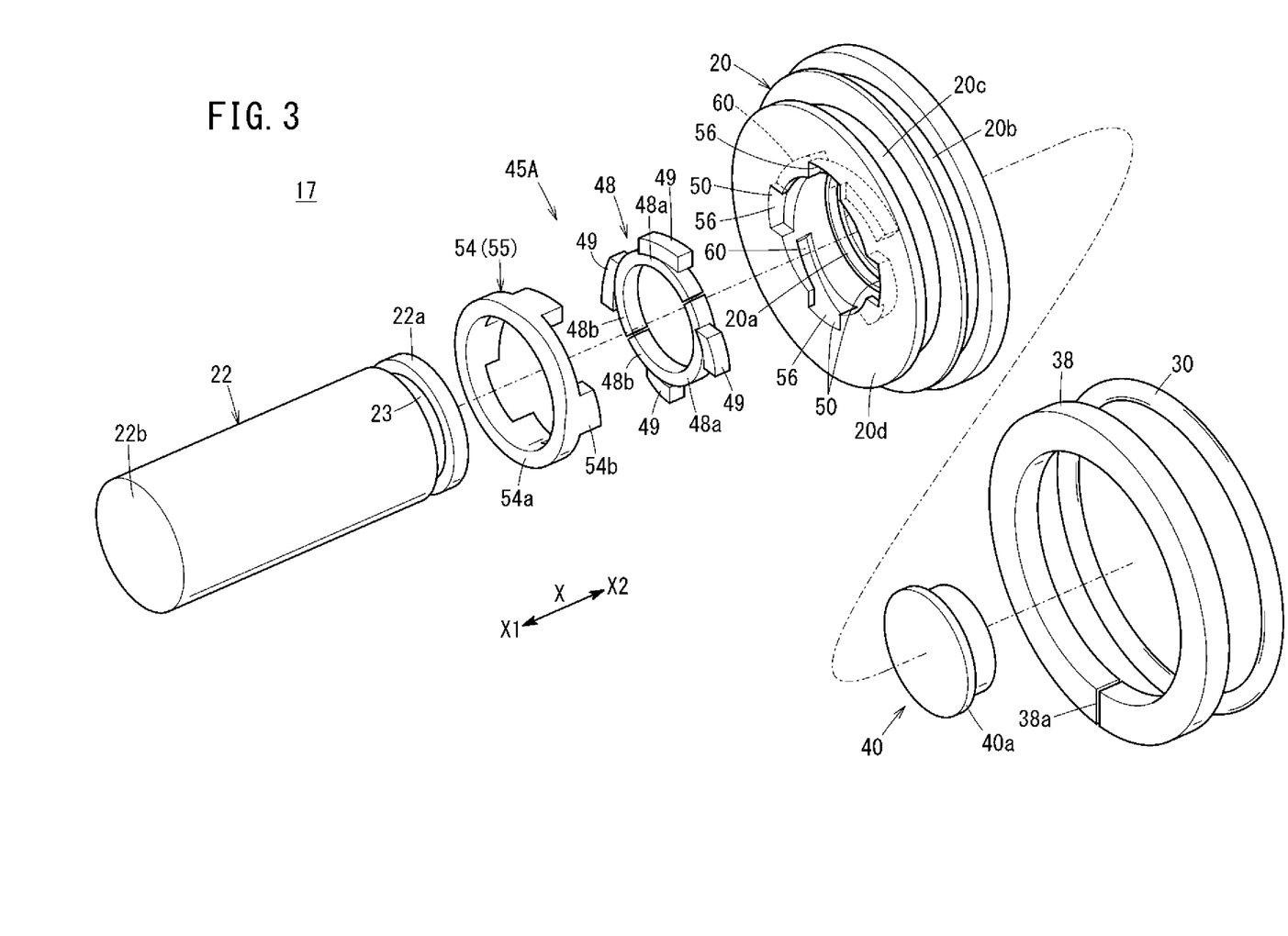
FIG. 3 is an exploded perspective view showing the piston assembly.

The piston member 20 is an annular member protruding radially outward from the proximal end 22a of the piston rod 22. The outer diameter of the piston member 20 is larger than the outer diameter of the piston rod 22. As shown in FIGS. 1 and 3, a through hole 20a extends through the center of the piston member 20 in the axial direction. An annular packing attachment groove 20b and an annular magnet attachment groove 20c are provided in the outer circumferential portion of the piston member 20 at an interval in the axial direction.

The piston member 20 is made of hard resin. For example, the piston member 20 may be made of resin by injection molding. The material of the piston member 20 is not limited to resin. For example, the piston member 20 may be made of metal such as carbon steel, stainless steel, aluminum alloy, etc.

Figure 2:
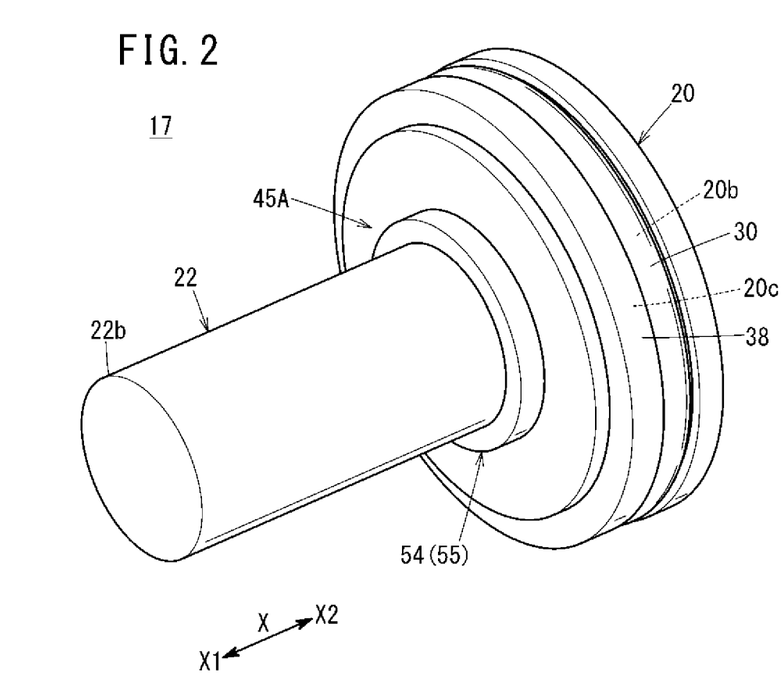
FIG. 2 is a perspective view showing a piston assembly.

As shown in FIGS. 1 and 2, a packing 30 is installed in the packing attachment groove 20b. The packing 30 is an elastic annular seal member (e.g., O-ring). The material of the packing 30 includes elastic materials such as rubber material, elastomer material, etc. The packing 30 tightly contacts the inner circumferential surface of the slide hole 13 and the packing attachment groove 20b over the entire periphery in an air tight manner or an in a liquid tight manner. The packing 30 provides sealing between the outer circumferential surface of the piston member 20 and the inner circumferential surface of the slide hole 13, and divides the interior of the slide hole 13 into the first pressure chamber 13a and the second pressure chamber 13b in an air tight manner or a liquid tight manner.

A circular ring shaped magnet 38 is installed in the magnet attachment groove 20c. The magnet 38 is a plastic magnet which is elastically deformable. As shown in FIG. 3, a slit 38a (a cut) is formed at a portion of the magnet 38 in the circumferential direction. In the structure, since the magnet 38 is elastically deformable, the magnet 38 can be installed in the magnet attachment groove 20c easily.

Magnetic sensors (not shown) are attached to the outer surface of the cylinder tube 12 shown in FIG. 1, at positions corresponding to both stroke ends of the piston member 20. By sensing the magnetism produced by the magnet 38, the operating position of the piston member 20 is detected.

The piston rod 22 is a columnar (cylindrical) member extending in the axial direction of the slide hole 13. The piston rod 22 passes through the rod cover 16. The distal end 22b of the piston rod 22 is exposed to the outside of the slide hole 13. Examples of the materials of the piston rod 22 include metal such as carbon steel, stainless steel, aluminum alloy, and hard resin, etc.

An end damper 40 is provided in the inner circumferential portion of the piston member 20. For example, the end damper 40 is made of elastic material such as rubber material, elastomer material, etc. (urethane rubber, etc.) The end damper 40 absorbs an impact when the piston member 20 reaches its stroke end on the head cover 14 side. The end damper 40 is held between the piston member 20 and the piston rod 22. The end damper 40 protrudes from a circular through hole 20a provided at the center of the piston member 20 toward the head cover 14 (in the direction indicated by the arrow X2).

The end damper 40 has a cylindrical shape (or a circular disk shape. An annular flange 40a protruding radially outwardly is provided at an end of the end damper 40 adjacent to the piston rod 22. The end damper 40 tightly contacts the inner circumferential portion of the piston member 20 and the end surface 22c of the piston rod 22 to thereby provide air- or liquid-tight sealing between the piston member 20 and the piston rod 22.

The piston assembly 17 includes a shaft coupling structure 45A coupling the piston rod 22 as a shaft member to the piston member 20 as a counterpart member. As shown in FIGS. 1 and 3, the shaft coupling structure 45A includes a stopper member 48 attached to the piston rod 22 in a relatively rotatable manner, a plurality of (four, in the illustrated example) slot grooves 50 formed in the piston member 20, and a rotation stop member 54 inserted into the slot grooves 50.

A stopper attachment groove 23 is provided in the outer circumferential portion of the piston rod 22. The stopper attachment groove 23 annularly extends in the circumferential direction. The stopper member 48 is installed in the stopper attachment groove 23. The stopper member 48 includes a plurality of engagement projections 49 protruding radially outward at intervals in the circumferential direction. The engagement projections 49 are spaced from one another at equal angular intervals.

The stopper member 48 is made up of a plurality of (two in FIG. 3) stopper pieces 48a divided in the circumferential direction. The stopper member 48 has an annular shape formed by combining the plurality of stopper pieces 48a. The stopper member 48 is inserted into the slot grooves 50 to prevent detachment of the stopper member 48 from the stopper attachment groove 23.

Specifically, each of the stopper pieces 48a includes an arc shaped base part 48b having a semi-circular shape. The arc shaped base part 48b is inserted into the stopper attachment groove 23. A plurality of engagement projections 49 are formed integrally with each arc shaped base part 48b. One engagement projection 49 may be provided for each arc shaped base part 48b.

Figure 4:
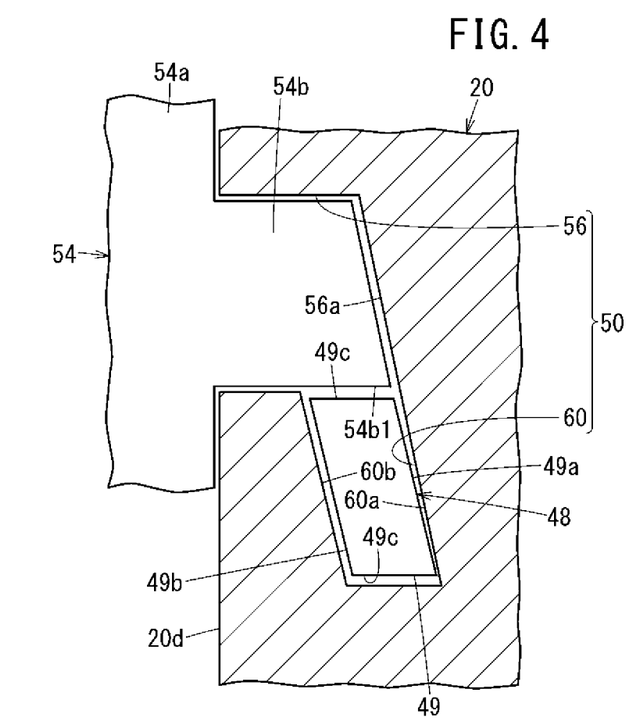
FIG. 4 is a schematic view showing a state where slot grooves and engagement projections are engaged with each other.

The engagement projections 49 are inclined from the circumferential direction. Specifically, the engagement projections 49 are inclined along inclined engagement grooves 60 described later. As shown in FIG. 4, the engagement projection 49 has a first surface 49a orientated in a direction in which the piston rod 22 is inserted with respect to the piston member 20, a second surface 49b oriented in the opposite direction of the first surface 49a, and two side surfaces 49c forming both end surfaces of the engagement projection 49 in the circumferential direction. The first surface 49a and the second surface 49b are inclined from the circumferential direction. The two side surfaces 49c are in parallel with the axis of the stopper member 48.

The piston rod 22 and the piston member 20 are coupled together through the stopper member 48 so as to be unmovable in the axial direction. For example, the stopper member 48 is made of hard material, e.g., made of the same material as that of the piston rod 22 described above.

As shown in FIG. 3, a plurality of slot grooves 50 are arranged at equal intervals on the circumference of a circle about the axis of the piston member 20, in the inner circumferential portion of the annular piston member 20. The plurality of engagement projections 49 are inserted respectively into the plurality of slot grooves 50. The slot grooves 50 have substantially the same shape. Each of the slot grooves 50 include an inlet groove 56 having an opening at an end surface 20d of the piston member 20 and having a depth in the axial direction, and further includes an inclined engagement groove 60 connected to the inlet groove 56.

The inlet groove 56 can receive the engagement projection 49 of the stopper member 48. As shown in FIG. 4, the engagement projection 49 of the stopper member 48 is inserted into the inclined engagement groove 60. Thus, the engagement projection 49 is engaged with the inclined engagement groove 60. The inclined engagement groove 60 extends in a direction inclined from the circumferential direction. Stated otherwise, the inclined engagement groove 60 extends spirally about the axis of the piston member 20. The inclined engagement groove 60 includes an inclined guide surface 60a inclined from the circumferential direction, and an inclined surface 60b inclined from the circumferential direction.

The inclined guide surface 60a faces the first surface 49a of the engagement projection 49 in a non-parallel manner. The inclined guide surface 60a is adjacent to the inner wall surface 56a formed at the deepest position of the inlet groove 56. The inner wall surface 56a is inclined from the circumferential direction such that the inner wall surface 56a and the inclined guide surface 60a are mutually connected so as to be flush with each other. A gap which gets larger in the axial direction toward the inlet groove 56 is formed between the inclined guide surface 60a and the first surface 49a. The inclined surface 60b faces the second surface 49b of the engagement projection 49. The inclined surface 60b is in parallel with the second surface 49b of the engagement projection 49.

The rotation stop member 54 is inserted into the plurality of slot grooves 50 so as to be nonrotatable relative to the piston member 20. The rotation stop member 54 prevents movement of the engagement projections 49 toward the inlet grooves 56. As shown in FIG. 3, the rotation stop member 54 includes an annular base part 54a formed in an annular shape around the piston rod 22, and a plurality of (four, in the illustrated embodiment) protrusions 54b protruding from the annular base part 54a toward the piston member 20 in the axial direction. The protrusions 54b are inserted into the inlet grooves 56. The annular base part 54a and the protrusions 54b are formed integrally.

As shown in FIG. 4, the protrusion 54b faces the engagement projection 49 in the circumferential direction. Specifically, the side surface 54b1 of the protrusion 54b is in parallel with the axis of the rotation stop member 54, and faces the side surface 49c of the engagement projection 49. The side surface 54b1 of the protrusion 54b is in parallel with the side surface 49c of the engagement projection 49.

In the assembled state of the piston assembly 17, the stopper member 48 is mounted in the stopper attachment groove 23 of the piston rod 22, and the engagement projections 49 of the stopper member 48 are engaged with the inclined engagement grooves 60 of the piston member 20. Thus, the piston member 20 and the piston rod 22 are connected in a state where the relative movement in the axial direction is prevented. Thus, the thrust force of the piston member 20 generated under the fluid pressure is suitably transmitted to the piston rod 22.

In the assembled state the piston assembly 17, the stopper member 48 is engaged with the slot grooves 50 of the piston member 20, and the stopper member 48 is rotatable relative to the piston rod 22. Therefore, the piston member 20 and the piston rod 22 are coupled together about the axis of the piston member 20 through the stopper member 48 in a relatively rotatable manner.

As shown in FIG. 1, in the state where the rotation stop member 54 is attached to the piston member 20, the rotation stop member 54 protrudes from the piston member 20 toward the rod cover 16. For example, the rotation stop member 54 is made of elastic material such as rubber material, elastomer material, etc. (urethane rubber, etc.) and also serves as an outer damper 55 for absorbing an impact when the piston member 20 reaches the stroke end on the rod cover 16 side.

In the fluid pressure cylinder 10A, the outer damper 55 may be provided as a component part separate from the stopper member 48. In the fluid pressure cylinder 10A, the end damper 40 may be dispensed with.

Next, an example of a method of assembling the piston assembly 17 having the above structure will be described.

Figure 5:
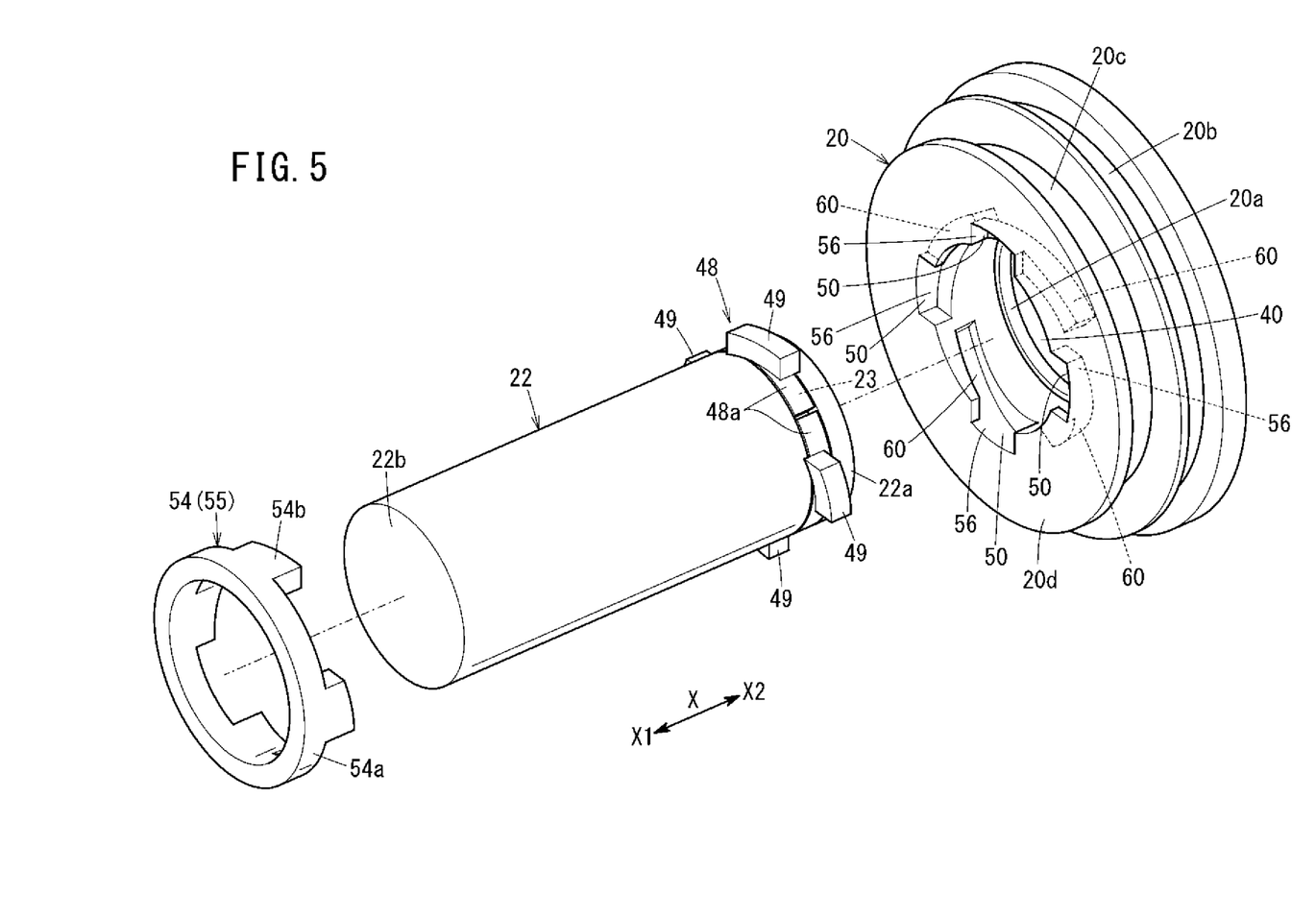
FIG. 5 is a first explanatory view showing a method of assembling a piston assembly.
Figure 6:
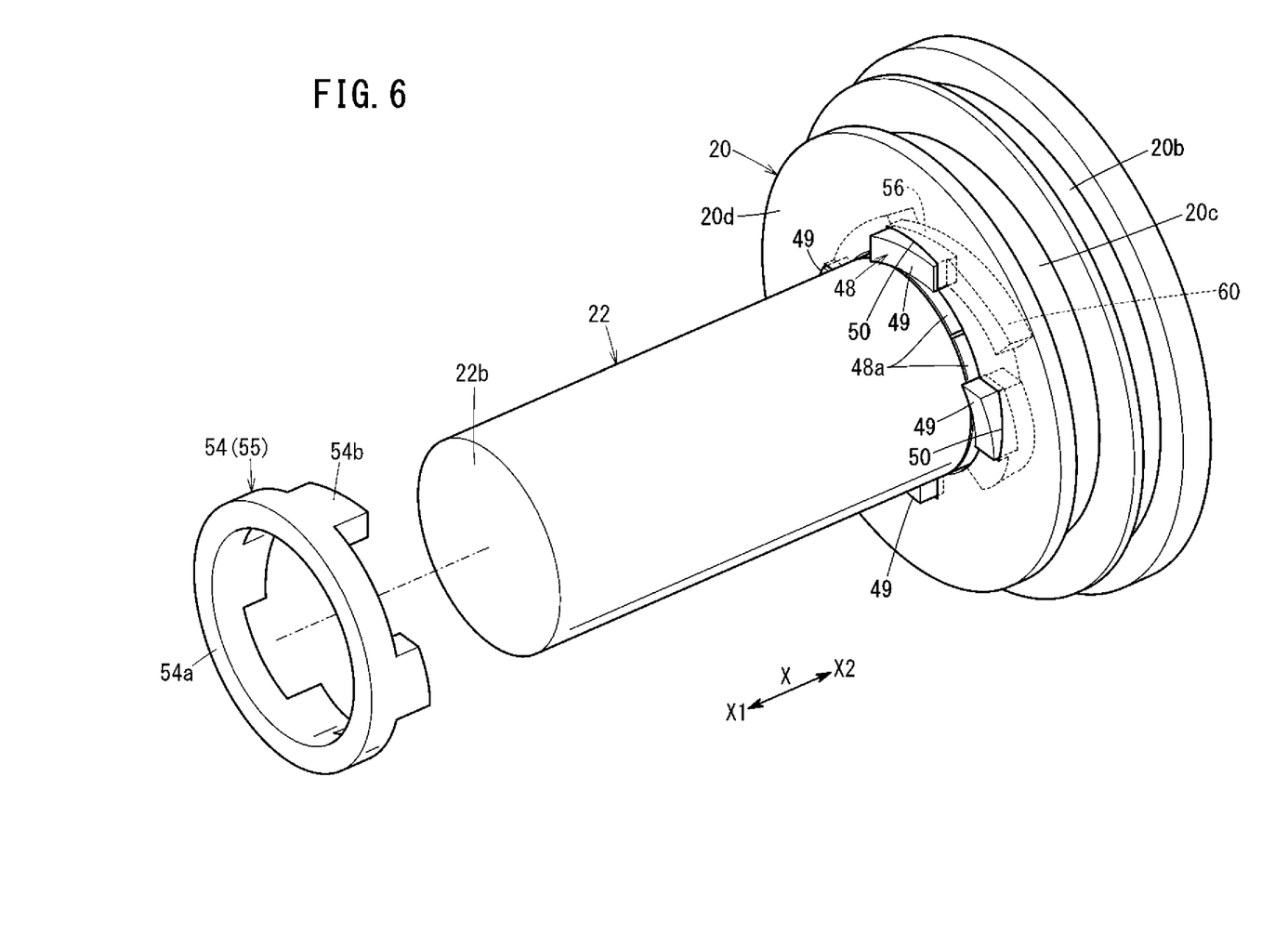
FIG. 6 is a second explanatory view showing a method of assembling a piston assembly.

Firstly, as shown in FIG. 5, the end damper 40 is attached to a through hole 20a of the piston member 20, and the stopper member 48 (a plurality of stopper pieces 48a) is installed in the stopper attachment groove 23 of the piston rod 22. Next, as shown in FIG. 6, by moving the piston rod 22 toward the piston member 20, the engagement projections 49 of the stopper member 48 are aligned with and inserted into the respective slot grooves 50 (inlet grooves 56) of the piston member 20. By this insertion, the engagement projections 49 are brought into contact with the inner wall surfaces 56a of the inlet grooves 56 at the deepest position (see FIG. 4).

Figure 7:
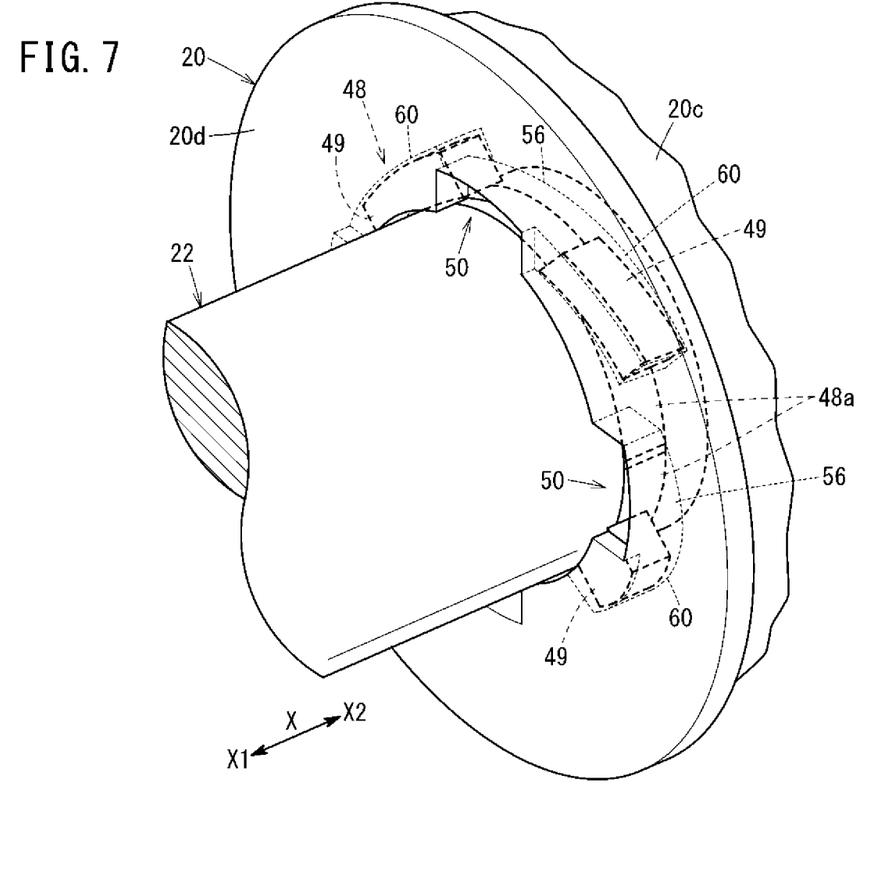
FIG. 7 is a third explanatory view showing a method of assembling a piston assembly.

Then, when the piston rod 22 is pushed further into the piston member 20 in the axial direction, as shown in FIG. 7, the engagement projections 49 of the stopper member 48 are guided by the inclined engagement grooves 60. Thus, the stopper member 48 is rotated relative to the piston member 20. At this time, the engagement projections 49 are guided by the inner wall surfaces 56a of the inlet grooves 56 and the inclined guide surfaces 60a of the inclined engagement grooves 60 (see FIG. 4), and moves inside the inclined engagement grooves 60. When the engagement projections 49 reach the deepest position of the inclined engagement grooves 60, rotation of the stopper member 48 is stopped.

Figure 8:
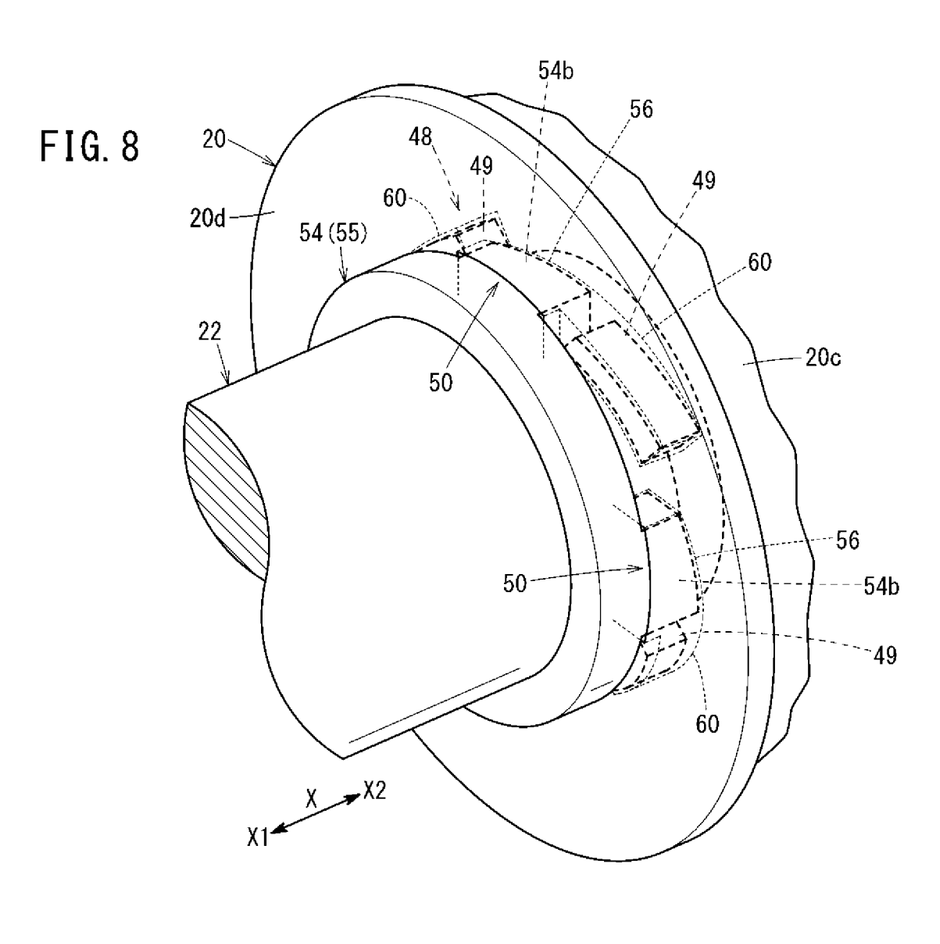
FIG. 8 is a fourth explanatory view showing a method of assembling a piston assembly.

Next, as shown in FIG. 8, by moving the rotation stop member 54 along the piston rod 22 in the axial direction, the rotation stop member 54 is attached to the slot grooves 50 of the piston member 20. Specifically, the plurality of protrusions 54b of the rotation stop member 54 are inserted into the inlet grooves 56 of the plurality of slot grooves 50. Thus, as shown in FIG. 4, the protrusions 54b are fitted into the inlet grooves 56, respectively, and the protrusions 54b are positioned adjacent to the engagement projections 49 in the circumferential direction.

Then, as shown in FIG. 2, the packing 30 and the magnet 38 are attached to the piston member 20. The packing 30 and the magnet 38 may be attached to the piston member 20 before coupling the piston member 20 and the piston rod 22 together.

Thus, the piston assembly 17 in the state shown in FIGS. 1 and 2 is obtained.

Next, operation of the fluid pressure cylinder 10A shown in FIG. 1 having the above structure will be described.

In the fluid pressure cylinder 10A, by operation of pressure fluid (e.g., compressed air) supplied through the first port 12a or the second port 12b, the piston member 20 is moved in the axial direction in the slide hole 13. Thus, the piston rod 22 coupled to the piston member 20 moves back and forth.

Specifically, in order to displace the piston member 20 toward the rod cover 16 (move the piston member 20 forward), the second port 12b is opened to the atmosphere, and the pressure fluid is supplied from a pressure fluid supply source (not shown) to the first pressure chamber 13a through the first port 12a. Thus, the piston member 20 is pushed toward the rod cover 16 by the pressure fluid. As a result, the piston member 20 is displaced toward the rod cover 16 (moves forward) together with the piston rod 22.

The outer damper 55 is brought into abutment against the end surface of the rod cover 16, whereby the forward movement of the piston member 20 is stopped. In this case, it is possible to avoid the direct contact between the piston member 20 and the rod cover 16 owing to the outer damper 55 made of an elastic material. Thus, it is possible to effectively prevent or suppress generation of impact and impact sound which could otherwise be generated when the piston member 20 reaches the forward position (the stroke end on the rod cover 16 side).

On the other hand, in order to displace the piston member 20 toward the head cover 14 (moving the piston member 20 backward), the first port 12a is opened to the atmosphere, and pressure fluid is supplied from a pressure fluid supply source (not shown) to the second pressure chamber 13b through the second port 12b. As a result, the piston member 20 is pushed toward the head cover 14 by the pressure fluid. Thus, the piston member 20 is displaced toward the head cover 14.

Then, the end damper 40 is brought into abutment against the head cover 14, whereby the backward movement of the piston member 20 is stopped. In this case, by the end damper 40 made of elastic material, direct contact between the piston member 20 and the head cover 14 can be avoided. Thus, it is possible to effectively prevent or suppress impact and impact sound which would otherwise be generated when the piston member 20 reaches the retracted position (the stroke end on the head cover 14 side).

In this case, the shaft coupling structure 45A and the fluid pressure apparatus (fluid pressure cylinder 10A) according to the first embodiment have the following advantageous effects.

In the shaft coupling structure 45A having the above structure, in the assembling process, simply by moving the stopper member 48 attached to the piston rod 22 in one direction relative to the piston member 20, it is possible to couple the piston rod 22 as the shaft member to the piston member 20 as the counterpart member. That is, by moving the stopper member 48 attached to the piston rod 22 in the axial direction relative to the piston member 20, the engagement projections 49 of the stopper member 48 are inserted into the inlet grooves 56 of the slot grooves 50 formed in the piston member 20. By pushing the engagement projections 49 further into the inlet grooves 56, the stopper member 48 is rotated inside the piston member 20 under the guiding operation of the inclined engagement grooves 60. Therefore, without using any dedicated tools or facility, it is possible to connect the piston member 20 and the piston rod 22 together easily, by rotating the stopper member 48 relative to the piston member 20 at the time of assembling. That is, assembling operation can be performed without using any tools. Thus, the assembling operation can be simplified by adopting the shaft coupling structure 45A.

An annular stopper attachment groove 23 is formed in the outer circumferential portion of the piston rod 22. The stopper member 48 comprises a plurality of stopper pieces 48a divided in the circumferential direction. The stopper member 48 is installed in the stopper attachment groove 23. In the structure, at the time of assembling, it is possible to easily attach the stopper member 48 to the outer circumferential portion of the piston rod 22.

The rotation stop member 54 is inserted into the plurality of slot grooves 50 in a nonrotatable manner relative to the piston member 20. The rotation stop member 54 prevents movement of the engagement projections 49 toward the inlet grooves 56. In the structure, the piston rod 22 is prevented from being detached from the piston member 20 as a result of the stopper member 48 being rotated after the assembling operation. Therefore, it is possible to reliably maintain a coupled state of the piston rod 22 and the piston member 20 after assembling.

The rotation stop member 54 includes a plurality of protrusions 54b inserted into the plurality of inlet grooves 56. The plurality of protrusions 54b face the plurality of engagement projections 49 in the circumferential direction. In the structure, when the stopper member 48 is rotated relative to the piston member 20, since the engagement projections 49 are reliably locked by the protrusions 54b, it is possible to reliably maintain the connection state between the piston rod 22 and the piston member 20 after the assembling operation.

The rotation stop member 54 includes an annular base part 54a formed in an annular shape around the piston rod 22. The plurality of protrusions 54b protrude in the axial direction from the annular base part 54a. In the structure, since the rotation stop member 54 is a single member having the annular base part 54a and the plurality of protrusions 54b, it is possible to attach the rotation stop member 54 to the piston member 20 easily by only one attachment operation.

The engagement projections 49 are inclined along the inclined engagement grooves 60. In the structure, it is possible to reduce rattling or backlash in the axial direction, between the engagement projections 49 and the inclined engagement grooves 60.

As shown in FIG. 4, the engagement projection 49 includes a first surface 49a oriented in an insertion direction of the piston rod 22 relative to the piston member 20, and a second surface 49b oriented in a direction opposite to the first surface 49a. Further, the inclined engagement groove 60 includes an inclined guide surface 60a. The inclined guide surface 60a faces the first surface 49a. The inclined guide surface 60a is not in parallel to the first surface 49a, and is inclined from the circumferential direction. In the structure, there is an angular difference between the inclined guide surface 60a against which the engagement projection 49 is pressed and the first surface 49a of the engagement projection 49. Therefore, the contact area between the engagement projection 49 and the inclined guide surface 60a is reduced. As a result, the friction resistance is reduced, and the engagement projection 49 can be inserted into the inclined engagement groove 60 smoothly. Therefore, since the stopper member 48 can be rotated easily with respect to the piston member 20, it is possible to reduce the force for pushing the piston rod 22 into the piston member 20, and the assembling operation can be performed more easily.

The inclined surface 60b of the inclined engagement groove 60 and the second surface 49b of the engagement projection 49 are in parallel to each other. In the structure, since the contact area between the engagement projection 49 and the inclined engagement groove 60 in the contact surface between the piston rod 22 and the piston member 20 in the detachment direction becomes larger, the friction resistance in the direction in which the engagement projection 49 is detached from the inclined engagement groove 60 becomes higher. Thus, it is possible to suitably suppress the rotation movement of the stopper member 48 when the force in the detachment direction is applied.

The piston rod 22 and the piston member 20 are coupled together in a relatively rotatable manner through the stopper member 48. In the structure, regardless of the outer shape of the piston member 20, at the time of installing a fluid pressure apparatus having the piston assembly 17 to equipment, the piston rod 22 can be rotated easily, which is convenient in the installing operation.

The present invention is not limited to the above described circular piston member 20. The present invention is also applicable to polygonal piston members. Therefore, in the fluid pressure cylinder 10A, instead of the piston assembly 17 having the circular piston member 20, a piston assembly having a polygonal piston member may be adopted.

In the piston assembly 17, the piston rod 22 having solid structure is adopted. Alternatively, a piston rod having hollow structure may be adopted.

In the above piston assembly 17, the piston rod 22 protruding toward only one side of the piston member 20 is adopted. Alternatively, a piston rod protruding toward both sides of the piston member 20 may be adopted.

In the piston assembly 17, both of the outer damper 55 and the end damper 40 are provided. Alternatively, as the damper mechanism, only the outer damper 55 may be provided. The rotation stop member 54 may not serve as the outer damper 55. In the fluid pressure cylinder 10A, an air cushion mechanism for absorbing the impact at the one stroke end and the other stroke end of the piston member 20 may be provided.

The magnet 38 may be omitted. A wear ring made of a low friction material may be attached to the outer circumferential portion of the piston member 20.

The fluid pressure cylinder 10A may be configured as a so called single acting cylinder in which movement of the piston in only one direction of the axial directions (frontward movement and backward movement) is effected by fluid pressure, and movement in the other direction is effected by an elastic force of a spring. In this case, in the first form including a spring, the spring is provided between the piston member 20 and the rod cover 16, and the second port 12b is opened to the atmospheric air. In the second form including a spring, the spring is provided between the piston member 20 and the head cover 14, and the first port 12a is opened to the atmospheric air.

Figure 9:
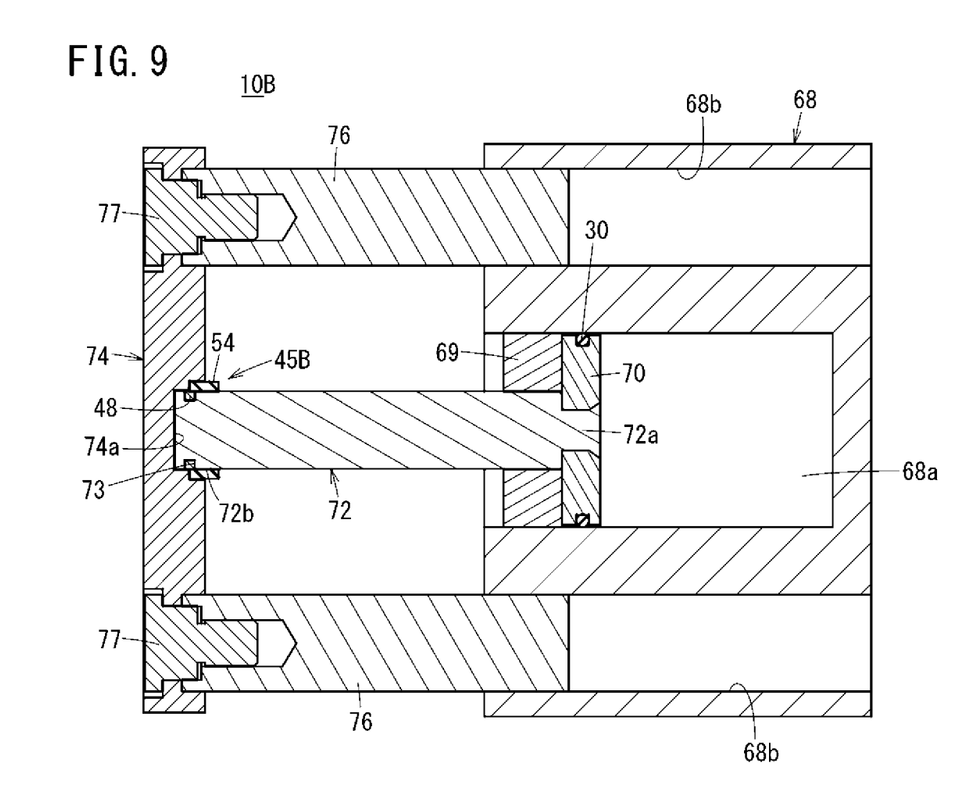
FIG. 9 is a cross sectional view showing a fluid pressure cylinder having a shaft coupling structure according to a second embodiment of the present invention.
Figure 10:
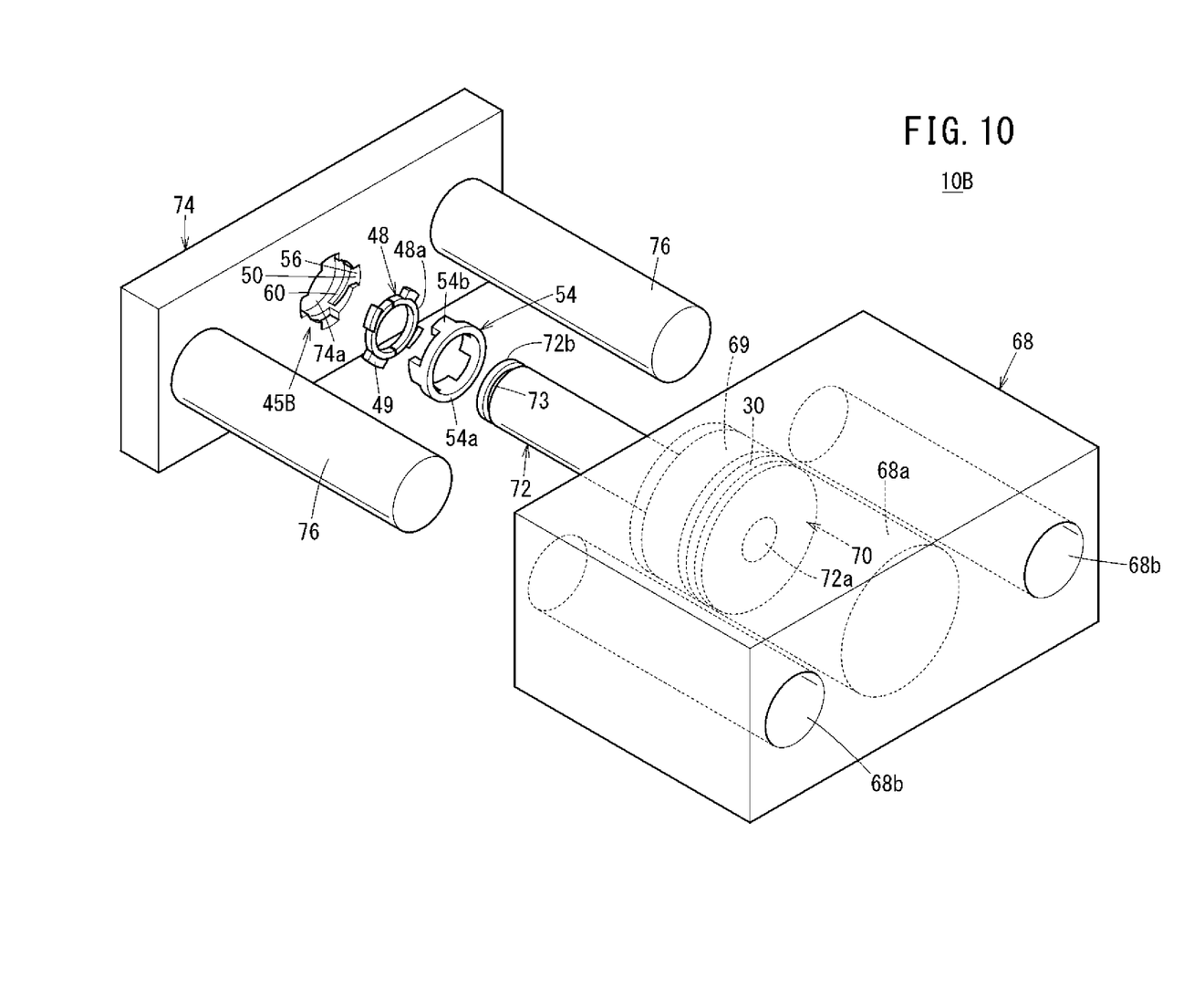
FIG. 10 is an exploded perspective view showing the fluid pressure cylinder shown in FIG. 9.

The fluid pressure cylinder 10B shown in FIGS. 9 and 10 are configured as a so called guide-equipped cylinder. The fluid pressure cylinder 10B includes a cylinder tube 68 (body) having a slide hole 68a and a plurality of (two, in the illustrated example) guide holes 68b, a piston member 70 provided slidably in the slide hole 68a, and a piston rod 72 (shaft member) coupled to the piston member 70 and protruding from the cylinder tube 68 in the axial direction. Further, the fluid pressure cylinder 10B includes an output member 74 (counterpart member) coupled to the piston rod 72 outside the cylinder tube 68, and a plurality of (two, in the illustrated example) guide rods 76 slidably inserted into the plurality of guide holes 68b and coupled to the output member 74.

At the proximal end part 72a of the piston rod 72, the piston member 70 and the piston rod 72 are coupled together by crimping or caulking. A rod cover 69 is provided in the slide hole 68a. The guide hole 68b extends in parallel to the slide hole 68a. The guide rod 76 is in parallel with the piston rod 72. The guide rods 76 are fastened to the output member 74 by bolts 77.

The fluid pressure cylinder 10B has a shaft coupling structure 45B for coupling the piston rod 72 as a shaft member to the output member 74 as a counterpart member thereof. This shaft coupling structure 45B has the same structure as the shaft coupling structure 45A shown in FIG. 1, etc., except a portion where the shaft coupling structure 45B is applied. Therefore, the constituent elements of the shaft coupling structure 45B that are identical to those of the shaft coupling structure 45A are labeled with the same reference numerals.

Specifically, in the shaft coupling structure 45B, the stopper member 48 is installed in an annular stopper attachment groove 73 formed in an outer circumferential portion 72b of the distal end portion of the piston rod 72. The plurality of slot grooves 50 are provided at the output member 74. A coupling recess 74a is provided on a side of the output member 74 facing the cylinder tube 68. A plurality of the slot grooves 50 are formed in the inner circumferential portion of the coupling recess 74a. The rotation stop member 54 is attached to the slot grooves 50 provided in the output member 74.

In the assembling process, the piston rod 72 and the output member 74 are coupled together, e.g., in the following procedure.

The piston rod 72 and the piston member 70 are coupled together and inserted into the slide hole 68a of the cylinder tube 68 before the piston rod 72 and the output member 74 are coupled together. Then, the rotation stop member 54 is provisionally disposed on the outer circumferential portion of the piston rod 72, and the stopper member 48 is installed in the stopper attachment groove 73. Next, the two guide rods 76 coupled to the output member 74 are inserted into the two guide holes 68b, respectively. Then, the piston rod 72 to which the stopper member 48 is attached is pushed into the coupling recess 74a of the output member 74. As a result, the stopper member 48 is rotated, and the engagement projections 49 are engaged with the inclined engagement grooves 60. Next, the rotation stop member 54 is moved in the axial direction, and attached to the slot grooves 50. In the manner described above, the piston rod 72 and the output member 74 are coupled together.

In the shaft coupling structure 45B, it is possible to simplify the assembling operation of the guide-equipped cylinder having the piston rod 72 and the output member 74. That is, in the assembling process, it is possible to couple the output member 74 and the piston rod 72 together, without using any dedicated tools or facilities. Further, since the piston rod 72 and the output member 74 can be coupled together by displacement in only one direction, the assembly operation can be performed in a compact space.

Further, unlike the case of coupling using bolts, since the output member 74 and the piston rod 72 are coupled together in a state where the output member 74 can rattle slightly in the radial direction of the piston rod 72 (i.e., the output member 74 and the piston rod 72 have small backlash in the radial direction of the piston rod 72) (in a floating state in the radial direction), the piston rod 72 is automatically centered with respect to a central position between the two guide rods 76. Therefore, no jig for the centering operation is required, and reduction in the man-hour for assembling is achieved. In contrast, in the case of structure where the piston rod and the output member are coupled by using the bolts, since the piston rod needs to be fixed at the central position between the two guide rods 76, a jig for the centering operation is required.

Unlike the structure where two component parts are coupled together using a T slot, in the shaft coupling structure 45B, it is possible to couple the two component parts (output member 74 and piston rod 72) that are restricted from being displaced in the lateral direction relative to the axis by the guide rod 76, without any difficulty.

It should be noted that the piston rod 72 and the piston member 70 may be coupled together by the shaft coupling structure 45A shown in FIG. 1, etc.

The shaft coupling structure of the present invention is not limited to the above described embodiment. Various modifications can be made without deviating from the scope of the present invention. For example, the present invention is applicable to fluid pressure cylinders where the piston member and the cylinder tube have non circular shapes in cross section (rectangular shape, oval shape, ellipse shape, etc.). Further, the present invention is applicable to fluid pressure cylinders of multi-rod types (dual rod type, etc.) having a plurality of pistons and a plurality of piston rods.

In addition to the above described embodiment, the shaft coupling structure of the present invention is applicable to the case of coupling a distal end member attached to the distal end of the piston rod, to the piston rod, or applicable to the coupling part of a floating joint.

The present invention is not limited to the fluid pressure cylinder used as an actuator, etc. The present invention is applicable to the fluid pressure apparatus in the other form having a piston. Examples of the fluid pressure apparatus having the piston to which the present invention is applicable include a valve apparatus capable of switching a flow channel by moving a valve plug using a piston, a length measuring cylinder (stroke reading cylinder) capable of measuring a length by displacing a piston coupled to a piston rod that serves as an input shaft, a slide table capable of displacing a piston for thereby displacing a table coupled to the piston through a piston rod, and a chuck apparatus capable of holding a workpiece with a holding part which performs opening/closing action by displacing a piston and converting the displacement of the piston.

The present invention is not limited to the above described embodiments. Various modifications can be adopted without deviating from the scope of the present invention.

The invention claimed is:

1. A shaft coupling structure configured to couple a shaft member to a counterpart member to be used in combination with the shaft member, the shaft coupling structure comprising:
   a stopper member attached to the shaft member so as to be relatively rotatable, and having a plurality of engagement projections protruding outward from the stopper member, the engagement projections being arranged at intervals in a circumferential direction; and
   a plurality of slot grooves provided on a circumference of circle in the counterpart member, the plurality of engagement projections being inserted into the slot grooves, respectively, wherein the plurality of slot grooves include:
      a plurality of inlet grooves opened at an end surface of the counterpart member and having a depth in an axial direction; and
      a plurality of inclined engagement grooves connected to the plurality of inlet grooves and extending in a direction inclined from the circumferential direction, the plurality of inclined engagement grooves being engaged with the plurality of engagement projections, and
   wherein the shaft member and the counterpart member are coupled together through the stopper member so as to be relatively unmovable in the axial direction.

2. The shaft coupling structure according to claim 1, wherein an annular stopper attachment groove is provided in an outer circumferential portion of the shaft member; and
the stopper member comprises a plurality of stopper pieces divided in the circumferential direction, and is installed in the stopper attachment groove.

3. The shaft coupling structure according to claim 1, further comprising a rotation stop member inserted into the plurality of slot grooves so as to be nonrotatable relative to the counterpart member,
wherein the rotation stop member prevents movement of the plurality of engagement projections toward the inlet grooves.

4. The shaft coupling structure according to claim 3, wherein the rotation stop member includes a plurality of protrusions inserted into the plurality of inlet grooves; and
the plurality of protrusions face the plurality of engagement projections in the circumferential direction.

5. The shaft coupling structure according to claim 4, wherein
the rotation stop member includes an annular base part formed in an annular shape around the shaft member; and
the plurality of protrusions protrude in the axial direction from the annular base part.

6. The shaft coupling structure according to claim 1, wherein
the plurality of engagement projections are inclined along the plurality of inclined engagement grooves.

7. The shaft coupling structure according to claim 6, wherein
each of the plurality of engagement projections includes a first surface orientated in a direction in which the shaft member is inserted into the counterpart member and a second surface oriented in an opposite direction of the first surface; and
each of the plurality of inclined engagement grooves includes an inclined guide surface facing the first surface in a nonparallel manner, and inclined from the circumferential direction.

8. The shaft coupling structure according to claim 6, wherein each of the plurality of engagement projections includes a first surface oriented in a direction in which the shaft member is inserted into the counterpart member and a second surface oriented in an opposite direction of the first surface; and
each of the plurality of inclined engagement grooves includes an inclined surface facing the second surface in a parallel manner, and inclined from the circumferential direction.

9. The shaft coupling structure according to claim 1, wherein the counterpart member is a piston body which is displaceable in an axial direction within a slide hole; and
the shaft member is a piston rod protruding in the axial direction from the piston body.

10. The shaft coupling structure according to claim 9, wherein
the shaft member and the counterpart member are coupled together through the stopper member so as to be relatively rotatable.

11. The shaft coupling structure according to claim 1, wherein the shaft member is a piston rod protruding from a body of a fluid pressure cylinder in an axial direction;
a guide rod is slidably supported by the body along an axis of the piston rod; and
the counterpart member is an output member coupled to the piston rod outside the body, and coupled to the guide rod.

12. A fluid pressure apparatus comprising:
a piston rod;
a counterpart member coupled to the piston rod;
a stopper member attached to the piston rod so as to be relatively rotatable, and having a plurality of engagement projections protruding outward from the stopper member, the engagement projections being arranged at intervals in a circumferential direction; and
a plurality of slot grooves provided on a circumference of circle in the counterpart member, the plurality of engagement projections being inserted into the slot grooves, respectively,
wherein the plurality of slot grooves include:
a plurality of inlet grooves opened at an end surface of the counterpart member and having a depth in an axial direction; and
a plurality of inclined engagement grooves connected to the plurality of inlet grooves and extending in a direction inclined from the circumferential direction, the plurality of inclined engagement grooves being engaged with the plurality of engagement projections, and
wherein the piston rod and the counterpart member are coupled together through the stopper member so as to be relatively unmovable in the axial direction.

13. The fluid pressure apparatus according to claim 12, wherein
the fluid pressure apparatus is in a form of a fluid pressure cylinder, a valve apparatus, a length measuring cylinder, a slide table, or a chuck apparatus.

* * * * *